US005191199A

United States Patent [19]

Elko

[11] Patent Number: 5,191,199

[45] Date of Patent: Mar. 2, 1993

[54] BAR CODE SCANNER SUPPORT MEMBER

[75] Inventor: Michael J. Elko, Ithaca, N.Y.

[73] Assignee: NCR Corporation, Dayton, Ohio

[21] Appl. No.: 628,180

[22] Filed: Dec. 12, 1990

[51] Int. Cl.[5] ........................ G06K 13/06; G06K 7/10

[52] U.S. Cl. .................................... 235/483; 235/462; 235/472

[58] Field of Search ........................ 235/472, 462, 483

[56] References Cited

U.S. PATENT DOCUMENTS 3,238,501 3/1966 Mak et al. ........................ 340/146.3
3,964,022 6/1976 Martin ........................... 340/146.3 J
4,210,802 7/1980 Sakai .................................. 235/472
4,317,029 2/1982 Warthan .............................. 235/454
4,457,016 6/1984 Pfeffer .................................. 382/59
4,538,072 8/1985 Immler et al. ....................... 250/568
4,698,490 10/1987 Nakase et al. ....................... 235/472
4,818,847 4/1989 Hara et al. .......................... 235/472
5,105,070 4/1992 Wike, Jr. et al. ................... 235/472

*Primary Examiner*—Eugene R. LaRoche
*Assistant Examiner*—Christopher R. Glembocki
*Attorney, Agent, or Firm*—Richard W. Lavin

[57] ABSTRACT

A portable bar code scanner includes a hood member having one end secured to the scanning head portion of the scanner. The other end of the hood member has a receding edge portion for help in supporting the scanner when positioned on a supporting surface.

5 Claims, 3 Drawing Sheets

BAR CODE SCANNER SUPPORT MEMBER

BACKGROUND OF THE INVENTION

The present invention relates to optical bar code scanning systems and more particularly to a support member for a portable bar code scanning device which enables the operator to properly orient the scanner in a reading position.

In present-day merchandising point-of-sale operations, data pertaining to the purchase of a merchandise item is obtained by reading data encoded indicia such as a bar code label printed on or attached to the merchandise item. In order to standardize the bar codes used in various point-of-sales checkout systems, the grocery industry has adopted a uniform product code (UPC) which is in the form of a bar code. Reading systems which have been constructed to read this type of bar code include hand-held scanners which are moved across the bar code to generate electrical signals representing the bar coded data. In reading the bar code label, the scanner should be oriented to the bar code label at an angle of between fifteen and twenty degrees to eliminate any direct reflection of the laser light beam and any ambient light back into the photodetector in the scanner which would interfere with the reading of the label.

SUMMARY OF THE INVENTION

A portable bar code scanning system is provided which comprises a hand held scanning unit having a handle portion and a scanning head portion which outputs scanning light beams in the form of a scan pattern. Mounted on the head portion is a hood member which fits over the face of the head portion and has a receding front edge portion which will support and balance the scanning unit on a horizontal surface at a desired reading angle.

It is therefore a principal object of this invention to provide a hood member for a portable optical bar code scanning apparatus which will support the scanning apparatus on a supporting surface.

It is another object of this invention to provide a hood member for a bar code scanning apparatus which will support the scanning apparatus on a supporting surface at a predetermined reading angle.

It is another object of this invention to provide a hood member for a portable bar code scanning apparatus which is simple in construction and therefore low in cost.

BRIEF DESCRIPTION OF THE DRAWINGS

These and other objects, features and advantages of the invention, as well as the invention itself, will become more apparent to those skilled in the art and in light of the following detailed description taken in consideration with the accompanying drawings wherein like reference numerals indicate like or corresponding parts throughout the several views and wherein.

DESCRIPTION OF THE PREFERRED EMBODIMENT

Figure 1:
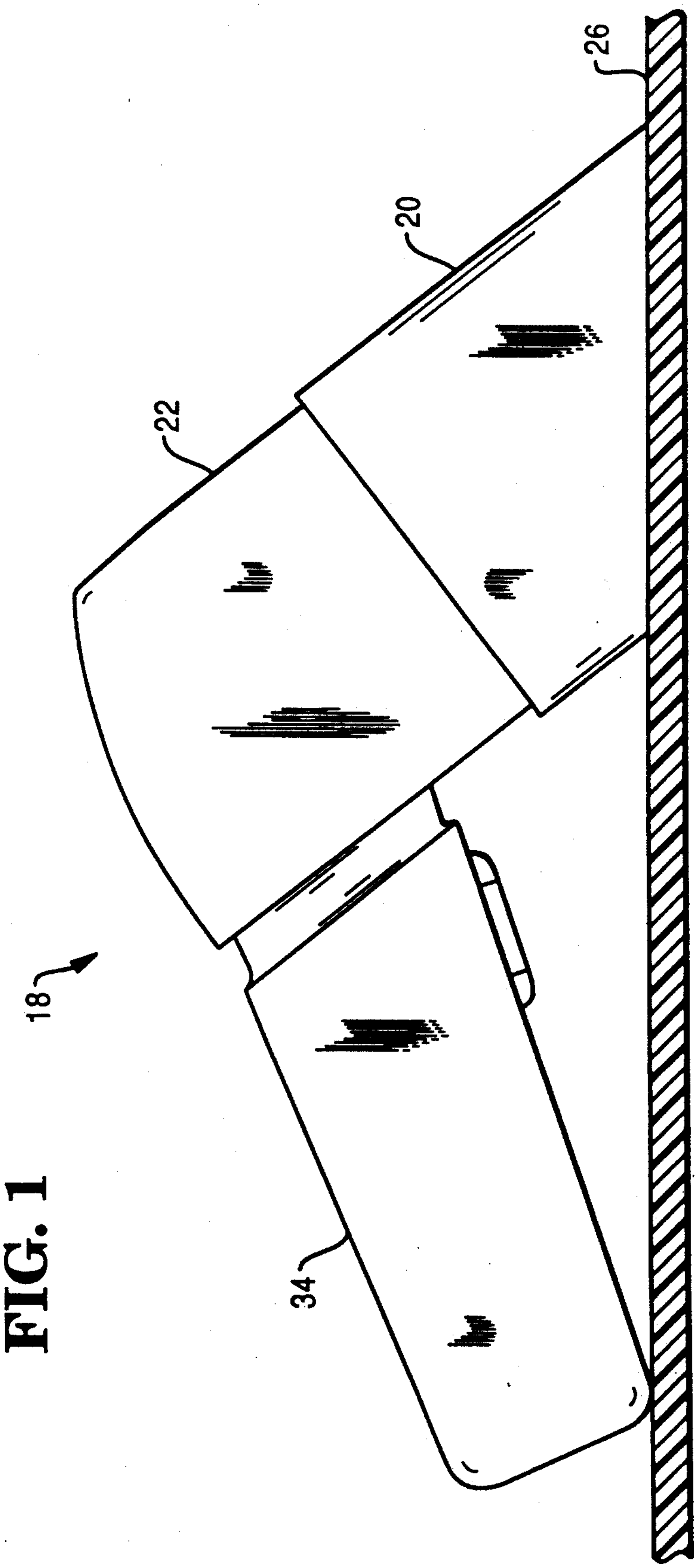
FIG. 1 is a side view of a portable optical bar code scanning apparatus which includes the hood member of the present invention showing the scanning apparatus positioned on a supporting surface at an angle which is the proper angle for reading a bar code label.
Figure 6:
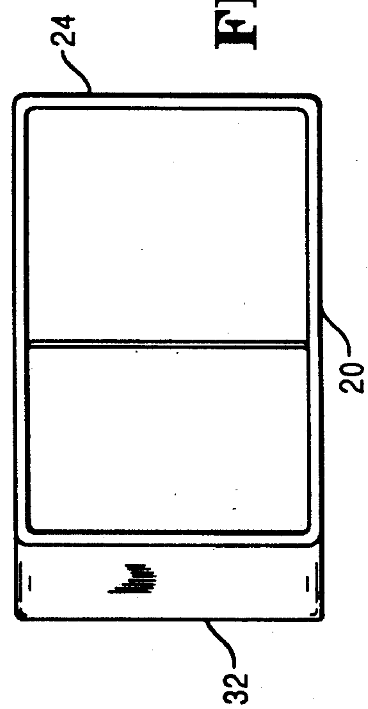
FIG. 6 is a bottom elevational view of the hood member of the present invention.

Referring now to FIG. 1, there is shown a side view of a portable bar code scanning device generally indicated by the numeral 18 on which is mounted the hood member 20 of the present invention consisting of a hollow rectangular shaped housing member whose interior dimensions conform to the outer circumferential dimension of the head portion 22 (FIG. 2) of the scanning apparatus 18. The configuration of the front edge 24 (FIG. 6) of the housing member recedes from the top edge to the bottom edge of the housing member as viewed in FIGS. 1 and 2 to position the scanning head at an angle of between fifteen and twenty degrees on a supporting surface 26 when the scanner is placed on the surface. This angle is the most desirable reading angle for scanning a bar code label since it minimizes the amount of ambient light which can be reflected back into the scanning apparatus thereby interfering with the reading of the bar code label. It will be seen that providing the scanning apparatus 18 with the hood member 20 having the receding front edge configuration tends to force the operator to read a bar code label at approximately the same angle when the scanning apparatus 18 is being moved past the bar code label thus increasing the chances of generating a valid read operation.

Figure 2:
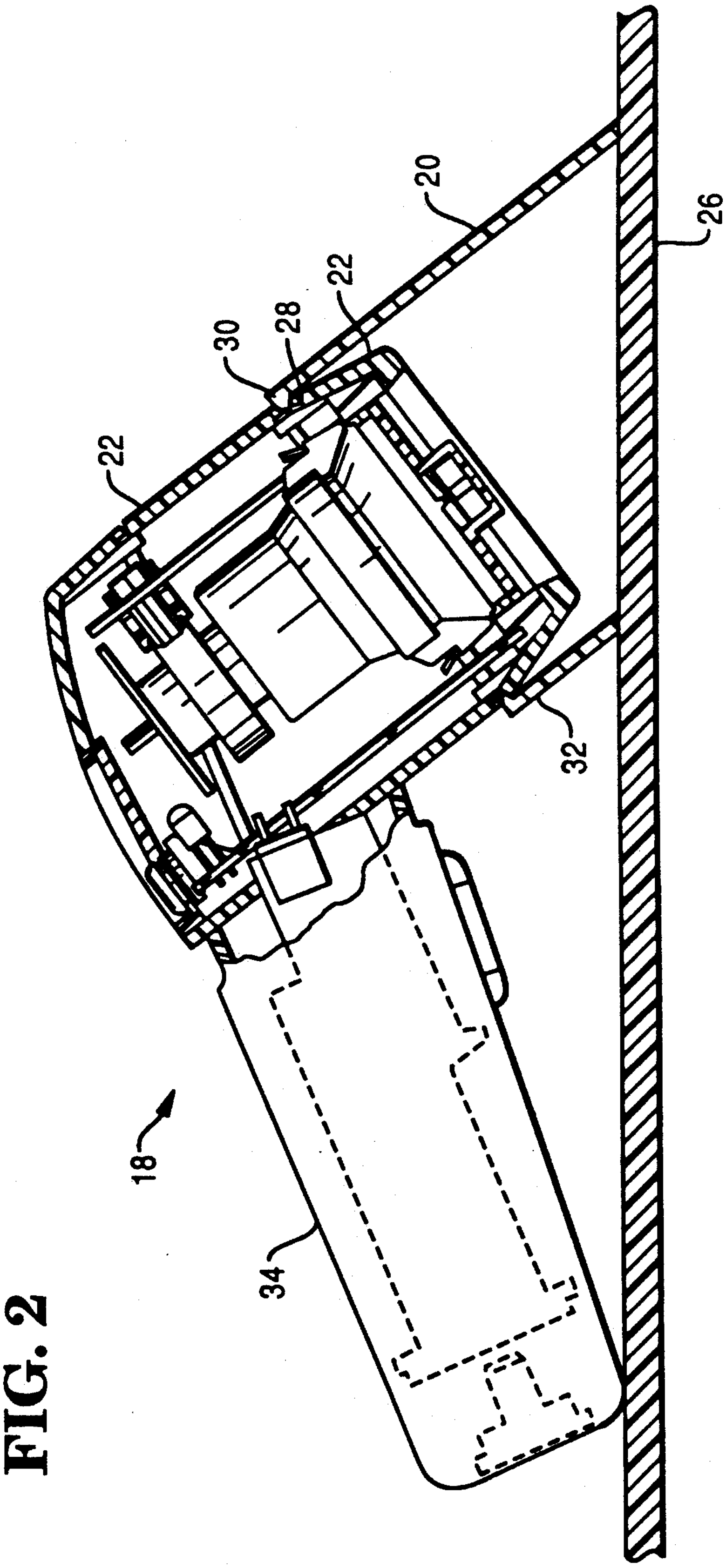
FIG. 2 is a partial side sectional view of the scanning apparatus of FIG. 1 showing how the hood member is attached to the head portion of the scanning apparatus.
Figure 3:
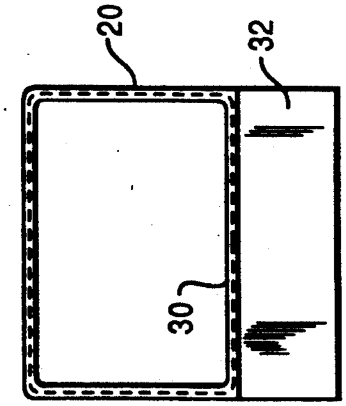
FIG. 3 is a rear elevational view of the hood member of the present invention.
Figure 4:
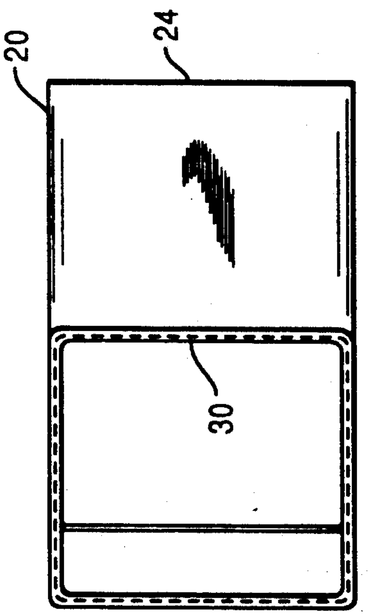
FIG. 4 is a top elevational view of the hood member of the present invention.
Figure 5:
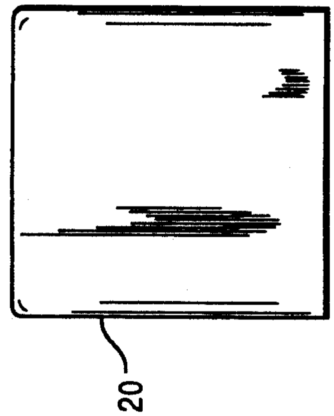
FIG. 5 is a front elevational view of the hood member of the present invention.

Referring now to FIG. 2, there is shown a partial sectional view of the head portion 22 of the scanning apparatus 18 and the hood member 20. The head portion 22 includes a circumferentially extending recessed portion 28 within which is positioned a rib portion 30 extending circumferentially along the inner surface of the rear end portion 32 of the hood member 20. The hood member 20 is constructed of any type of plastic material which is sufficiently pliable to allow the rib portion 30 of the hood member to be inserted within the recessed portion 28 of the scanning apparatus 18 for attaching the hood member to the scanning apparatus but rigid enough to support the scanning apparatus on the surface 26.

When the operator places the scanning apparatus 18 on the surface 26, the apparatus will be supported by the hood member 20 and the handle portion 34 of the scanning apparatus 18. It will be seen from FIGS. 1 and 2 that when in supported position, the handle portion 34 is oriented to allow the operator to easily grasp the handle portion preparatory to scanning a bar code label. It will further be seen that the construction of the hood member of the present invention provides a solid foundation for the scanning apparatus when positioned on the surface 26 eliminating any tendency to be toppled if accidentally hit by the operator.

Although the preferred embodiment of the present invention has been described herein, it is not intended that the invention be restricted thereto, but that it be limited only by the true spirit and scope of the appended claims.

What is claimed is:

1. In combination with a portable optical bar code scanner having a scanning head portion and a handle portion, an elongated hollow cover member having one end secured to the head portion and its other end having an edge configuration oriented at an angle to the axis of the cover member for supporting, together with the handle portion, the scanner at an acute angle when in a rest position on a supporting surface, said edge configured such that when supporting the scanner all of the periphery of the angled edge is flush with said supporting surface.

2. The combination of claim 1 in which the scanning head portion is orientated at an angle of between fifteen and twenty degrees when the scanner is positioned on the supporting surface.

3. A portable optical scanning apparatus comprising;

a head portion for projecting scanning light beams along an axis for scanning a coded label;

a handle portion secured to said head portion; and an elongated hollow cover member extending along said axis having a rear end portion secured to said head portion and a front end portion having a receding edge portion for supporting, together with the handle portion, the head portion at an acute angle to a supporting surface wherein the scanning apparatus is supported on the supporting surface in a rest position by the periphery of the front end portion including said receding edge portion and the handle portion.

4. The combination of claim 3 in which the the head portion is orientated at an angle of between fifteen and twenty degrees when the scanner is positioned on the supporting surface.

5. The combination of claim 3 in which the head portion includes a recessed portion and said rear end portion of said cover member includes an abutment portion for engaging the recessed portion for mounting the cover member on the head portion.

* * * * *